(12) United States Patent
Imoto et al.

(10) Patent No.: US 8,563,854 B2
(45) Date of Patent: Oct. 22, 2013

(54) DYE-SENSITIZED PHOTOELECTRIC CONVERSION APPARATUS AND MANUFACTURING METHOD THEREOF

(75) Inventors: Tsutomu Imoto, Kanagawa (JP); Masao Oda, Tokyo (JP)

(73) Assignee: Sony Corporation, Tokyo (JP)

( * ) Notice: Subject to any disclaimer, the term of this patent is extended or adjusted under 35 U.S.C. 154(b) by 1245 days.

(21) Appl. No.: 10/525,496

(22) PCT Filed: Aug. 19, 2003

(86) PCT No.: PCT/JP03/10454
§ 371 (c)(1),
(2), (4) Date: Nov. 1, 2005

(87) PCT Pub. No.: WO2004/019441
PCT Pub. Date: Mar. 4, 2004

(65) Prior Publication Data
US 2006/0137739 A1    Jun. 29, 2006

(30) Foreign Application Priority Data
Aug. 23, 2002  (JP) .................................. 2002-242751

(51) Int. Cl.
*H01L 31/00* (2006.01)
(52) U.S. Cl.
USPC ............................ 136/263; 136/255; 136/256
(58) Field of Classification Search
USPC ........................................ 136/263, 255, 256
See application file for complete search history.

(56) References Cited

U.S. PATENT DOCUMENTS

| | | | |
|---|---|---|---|
| 5,320,723 A | 6/1994 | Kawakami | |
| 5,350,644 A | 9/1994 | Graetzel et al. | |
| 5,720,827 A * | 2/1998 | Simmons | 136/250 |
| 5,940,550 A | 8/1999 | Plickert et al. | |
| 6,100,466 A | 8/2000 | Nishimoto | |
| 6,261,684 B1 | 7/2001 | Takahashi et al. | |
| 6,291,763 B1 | 9/2001 | Nakamura | |
| 6,350,946 B1 | 2/2002 | Miyake et al. | |

(Continued)

FOREIGN PATENT DOCUMENTS

| | | |
|---|---|---|
| EP | 1 058 260 A1 | 12/2000 |
| EP | 1 100 086 A2 | 5/2001 |

(Continued)

OTHER PUBLICATIONS

JP 2002-008741, Machine Translation (Jan. 2002).*

(Continued)

*Primary Examiner* — Jonathan Johnson
*Assistant Examiner* — Thanh-Truc Trinh
(74) *Attorney, Agent, or Firm* — Wolf, Greenfield & Sacks, P.C.

(57) ABSTRACT

A dye-sensitized photoelectric conversion apparatus having enhanced energy conversion efficiency and a production method thereof are provided.
The dye-sensitized photoelectric conversion apparatus which has semiconductor layer (13) containing a photosensitizing dye (14) and is constituted such that a charge carrier generated by allowing light to incident in the photosensitizing dye (14) is drawn out through the semiconductor layer (13), in which the semiconductor layer (13) is constituted by a plurality of regions (13A to 13D) having different energy levels from one another of a passage through which the charge carrier is transferred. Further, the plurality of regions (13A to 13D) are arranged such that the energy levels are reduced stepwise and/or continuously in the direction of drawing the charge carrier out.

7 Claims, 7 Drawing Sheets

(56) References Cited

U.S. PATENT DOCUMENTS

| | | | |
|---|---|---|---|
| 6,376,765 B1 | 4/2002 | Wariishi et al. | |
| 6,538,194 B1 * | 3/2003 | Koyanagi et al. | 136/256 |
| 6,586,670 B2 | 7/2003 | Yoshikawa | |
| 6,602,998 B2 | 8/2003 | Kobuke et al. | |
| 6,766,817 B2 | 7/2004 | Silva | |
| 6,852,555 B1 | 2/2005 | Roman et al. | |
| 6,911,595 B2 | 6/2005 | Yoshikawa et al. | |
| 6,929,970 B2 | 8/2005 | Andriessen et al. | |
| 2001/0027252 A1 | 10/2001 | Kobuke et al. | |
| 2001/0029975 A1 | 10/2001 | Takehama et al. | |
| 2002/0015881 A1 | 2/2002 | Nakamura et al. | |
| 2002/0031080 A1 | 3/2002 | Inoue | |
| 2002/0117201 A1 * | 8/2002 | Nelles et al. | 136/263 |
| 2002/0134426 A1 * | 9/2002 | Chiba et al. | 136/263 |
| 2003/0183271 A1 | 10/2003 | Ikeda et al. | |
| 2003/0188776 A1 | 10/2003 | Li et al. | |
| 2003/0230337 A1 | 12/2003 | Gaudiana et al. | |
| 2004/0112421 A1 * | 6/2004 | Spivack et al. | 136/256 |
| 2004/0202064 A1 | 10/2004 | Inoue et al. | |
| 2004/0250267 A1 | 12/2004 | Tsutsumi et al. | |
| 2004/0251508 A1 | 12/2004 | Tomita | |
| 2005/0016578 A1 | 1/2005 | Enomoto et al. | |
| 2005/0022221 A1 | 1/2005 | Inatani et al. | |
| 2005/0218467 A1 | 10/2005 | Tomita | |
| 2005/0224112 A1 | 10/2005 | Tokita et al. | |
| 2006/0048812 A1 | 3/2006 | Tomita | |
| 2006/0084257 A1 | 4/2006 | Tokita et al. | |
| 2006/0107994 A1 | 5/2006 | Morooka et al. | |
| 2006/0112988 A1 | 6/2006 | Morooka | |
| 2006/0137739 A1 | 6/2006 | Imoto et al. | |
| 2006/0185717 A1 | 8/2006 | Ishibashi et al. | |
| 2007/0125418 A1 | 6/2007 | Suzuki et al. | |
| 2009/0078315 A1 | 3/2009 | Suzuki et al. | |
| 2010/0255632 A1 | 10/2010 | Ishibashi et al. | |
| 2010/0326516 A1 | 12/2010 | Morooka | |

FOREIGN PATENT DOCUMENTS

| | | |
|---|---|---|
| EP | 1 152 418 A1 | 11/2001 |
| EP | 1 156 488 A2 | 11/2001 |
| EP | 1 431 971 A1 | 6/2004 |
| JP | 10-209048 A | 8/1998 |
| JP | 10-233238 A | 9/1998 |
| JP | 10-255863 A | 9/1998 |
| JP | 10-255863 A1 | 9/1998 |
| JP | 10-334954 A | 12/1998 |
| JP | 11-167937 A | 6/1999 |
| JP | 11-354169 A | 12/1999 |
| JP | 2000-082506 A | 3/2000 |
| JP | 2000-100484 A | 4/2000 |
| JP | 2000-106222 A | 4/2000 |
| JP | 2000-195569 A | 7/2000 |
| JP | 2000-231942 A | 8/2000 |
| JP | 2000-243463 A | 9/2000 |
| JP | 2000-268890 A | 9/2000 |
| JP | 2000-268891 A | 9/2000 |
| JP | 2000-285975 A | 10/2000 |
| JP | 2001-093589 A | 4/2001 |
| JP | 2001-93591 A | 4/2001 |
| JP | 2001-093591 A | 4/2001 |
| JP | 2001-111074 A | 4/2001 |
| JP | 2001-143771 A | 5/2001 |
| JP | 2001-247314 A | 9/2001 |
| JP | 2001-247546 A | 9/2001 |
| JP | 2001-253883 A | 9/2001 |
| JP | 2001-319698 A | 11/2001 |
| JP | 2001-357896 A | 12/2001 |
| JP | 2002-008740 A | 1/2002 |
| JP | 2002-8740 A | 1/2002 |
| JP | 2002-008741 * | 1/2002 |
| JP | 2002-008741 A | 1/2002 |
| JP | 2002-8741 A | 1/2002 |
| JP | 2002-025635 A | 1/2002 |
| JP | 2002-25635 A | 1/2002 |
| JP | 2002-063949 A | 2/2002 |
| JP | 2002-175843 A | 6/2002 |
| JP | 2002-222971 A | 8/2002 |
| JP | 2002-231942 A | 8/2002 |
| JP | 2002-289269 A | 10/2002 |
| JP | 2002-289269 A1 | 10/2002 |
| JP | 2002-289274 A | 10/2002 |
| JP | 2002-298646 A | 10/2002 |
| JP | 2002-319689 A | 10/2002 |
| JP | 2002289274 A | 10/2002 |
| JP | 2002-334729 A | 11/2002 |
| JP | 2002-352868 A | 12/2002 |
| JP | 2002-352869 A | 12/2002 |
| JP | 2002-352870 A | 12/2002 |
| JP | 2002-353432 A | 12/2002 |
| WO | WO 02/14322 | 2/2002 |
| WO | WO 02/071530 A1 | 9/2002 |

OTHER PUBLICATIONS

Wang et al., "The photoelectrochemistry of transition metal-ion-doped TiO2 nanocrystalline electrodes and higher solar cell conversion efficiency based on Zn2+-doped TiO2 electrode", Journal of material science, 34, 1999, pp. 27773-27779.*

E-mail from Silva, E ; "US 20060107994—Requesting IDS of 6,766,817"; May 25, 2006.

E-mail from Silva, E ; "US 20050016578—Requesting IDS of 6,766,817"; May 25, 2006.

Uchida, Satoshi, "Application of Titania Nanotubes to a Dye-Sensitized Solar Cell," Electrochemistry, Jun. 2002, vol. 70, No. 6, pp. 418-420.

Adachi, Motonari, "Dye-Sensitized Solar Cells Using Semiconductor Thin Film Composed of Titania Nanotubes," Electrochemistry, Jun. 2002, vol. 70, No. 6, pp. 449-452.

Adachi, Motonari, "Formation, Characterization, and Functions of Ceramic Nanotubes," Transactions of the Materials Research Society of Japan, Sep. 2002, vol. 27, No. 3, pp. 505-508.

Ngamsinlapasathian, S., "Higher Efficiency in Dye-Sensitized Solar Cells Using Titania Nanotube,"2002 Nen Denki Kagaku Shuki Taikai Koen Yoshishu, Sep. 2002, p. 138.

Tachibana, Y. et al., "Electron Injection and Recombination in Dye Sensitized Nanocrystalline Titanium Dioxide Films: A Comparison of Ruthenium Bipyridyl and Porphyrin Sensitizer Dyes," J. Phys. Chem. B, 2000, pp. 1198-1205, vol. 104.

Optoelectronic. (2001). In Hargrave's Communications Dictionary, Wiley. Retrieved Dec. 18, 2007 from http://www.credoreference.com/entry/2723224.

Ma, Tingli, et al. "Recent Advances in Research and Development for Dye-Sensitized Solar Cells: Development of Porphyrin-Sensitized Solar Cells," May 25, 2000, Chapter 15, Kurashiki Printing Co., Ltd., Osaka, Japan.

Imahori, Hiroshi, "Recent Advances in Research and Development for Dye-Sensitized Solar Cells: Photoelectric Conversion by Electrode Bonded with Monomolecular Film of Porphyrin," May 25, 2000, Chapter 32, Kurashiki Printing Co., Ltd., Osaka, Japan.

Meinhardt et al. "Optoelectronic Device made from Multilayer and Molecularly Doped Organic Layers," SPIE Conference on Organic Photonic Materials and Devices vol. 3623, Jan. 1999, pp. 46-57.

http://server2.idtechex.com/products/en/presentation.asp-?presentationid=646 : Accessed on Jan. 31, 2008.

* cited by examiner

US 8,563,854 B2

DYE-SENSITIZED PHOTOELECTRIC CONVERSION APPARATUS AND MANUFACTURING METHOD THEREOF

TECHNICAL FIELD

The present invention relates to a dye-sensitized photoelectric conversion apparatus applicable to a solar cell and the like and a manufacturing method thereof.

BACKGROUND ART

A solar cell utilizing sunlight is receiving attention as an energy source that can substitute for a fossil fuel, and various types of studies have been exerted. The solar cell is one type of photoelectric conversion apparatus which can convert light energy into electric energy.

The solar cell which utilizes a pn junction of a semiconductor is most widely distributed, but, since it is necessary to conduct a step of manufacturing a semiconductor material of high purity or a step of forming the pn junction, there is a problem in that an economical cost and an energy cost in a manufacturing process are high.

On the other hand, a dye-sensitized photochemical cell which utilizes a light-excited electron transfer has been proposed by Graetzel et al. (Japanese Patent No. 2664194; J. Am. Chem. Soc. (1993), 115, 6382 to 6390; Nature (1991), 353, 737; and the like) and is expected to be the solar cell of the new generation capable of being produced at low cost by using a low-priced material.

FIG. 6 is a schematic cross-sectional diagram showing an example of a conventional representative dye-sensitized photochemical cell. The dye-sensitized photochemical cell is primarily constituted by a transparent substrate 1 such as glass, a transparent electrode (negative electrode) 2 comprising a transparent conductive film of, for example, ITO (Indium Tin Oxide), a semiconductor layer 3, a photosensitizing dye 4 adsorbed on a surface of the semiconductor layer 3, a counter electrode (positive electrode) 6, an electrolyte layer 5 sandwiched between the semiconductor layer 3 and the counter electrode 6, another substrate 7, a sealing material 8 and the like.

As for the semiconductor layer 3, a porous article prepared by sintering fine grains of titanium oxide $TiO_2$ is used in many cases. On a surface, on the side of the electrolyte layer 5, of the semiconductor 3, a photosensitizing dye 4 is adsorbed. As for the photosensitizing dye 4, a material having an absorption spectrum in the vicinity of a visible light region such as a ruthenium complex is used. As for the electrolyte layer 5, an electrolyte solution containing an oxidation-reduction system (redox pair) such as $I^-/I_2$ (however, actually, $I_2$ is combined with $I^-$ and exists in a form of $I_3^-$.) is mentioned.

An apparatus as shown in FIG. 6 operates as a cell in which the counter electrode 6 is a positive electrode and the transparent electrode 2 is a negative electrode, when light is incident in the apparatus. A theory of such operation is as described below.

When the photosensitizing dye 4 absorbs a photon which passes through the semiconductor layer 3, an electron inside the photosensitizing dye 4 is excited to undergo transition from a ground state to an excited state. The electron in the excited state is quickly drawn out into a conduction band of the semiconductor layer 3 via an electric bond between the photosensitizing dye 4 and the semiconductor layer 3, passes through the semiconductor layer 3 and, then, reaches the transparent electrode 2.

On the other hand, the photosensitizing dye 4 which has been oxidized by losing the electron receives an electron from a reducing agent (for example $I^-$) in the electrolyte layer 5 to be reduced. The reducing agent (for example, $I_2$) which has lost the electron reaches the counter electrode 6 by a diffusion effect and, there, receives an electron from the counter electrode 6 and is, accordingly, reduced and is back to an original reducing agent.

In such a manner as described above, light energy is converted into electric energy without leaving any change in each of the photosensitizing dye 4 and the electrolyte layer 5.

Most important points for effectively operating a photoelectric conversion element are: efficiently absorbing light; efficiently generating-separating a charge carrier (for example, electron) from the excited state caused by absorbing the light energy; and quickly drawing the thus-separated charge carrier outside as a current.

In the dye-sensitized photochemical cell, light absorption is borne by the photosensitizing dye 4 and efficient absorption can be attained by selecting an optimum photosensitizing dye 4.

Generation and separation of the charge carrier from the excited state is performed at an interface between the photosensitizing dye 4 and the semiconductor layer 3. Namely, while the electron is drawn from the photosensitizing dye 4 in the excited state into the conduction band of the semiconductor layer 3, the photosensitizing dye 4 which has lost the electron stays on the surface of the semiconductor layer 3, to thereby attain the generation and separation of the charge carrier.

However, since a subsequent movement of the electron in the semiconductor layer 3 is relied on a diffusive migration, some electrons which are each combined with a hole in the semiconductor layer 3 or recombined with the photosensitizing dye which has lost the electron at the interface between the semiconductor layer 3 and the photosensitizing dye 4 and, accordingly, can not reach the transparent electrode 2 are generated. Since these electrons can not be drawn out as an electric current, the electrons cause a reduction of energy conversion efficiency.

In an effort to enhance the energy conversion efficiency of the dye-sensitized photochemical cell, studies and developments are in progress in various fields. As far as the semiconductor layer is concerned, besides titanium oxide $TiO_2$, not only oxide semiconductors and the like such as Nb2O5 and ZnO are used, but also a complex form thereof, namely, an electrode made of a tin oxide grain zinc•oxide grain mixture, or another electrode made of a complex in which a tin oxide grain is subjected to a surface treatment by a heterogeneous metal oxide is used. (Newest Technology of Dye-Sensitized Solar Cell, supervised and edited by Hironori Arakawa, Chapters 16 and 17, CMC (2001)). However, a concrete guide line for forming a complex while taking an energy level of the semiconductor into consideration has not yet been established.

Under these circumstances, the present invention has been attained and an object thereof is to provide a dye-sensitized photoelectric conversion apparatus in which an energy conversion efficiency has been enhanced and a manufacturing method thereof.

DISCLOSURE OF THE INVENTION

Namely, the present invention relates to a dye-sensitized photoelectric conversion apparatus, comprising a semiconductor layer comprising a photosensitizing dye, being constituted such that a charge carrier generated by allowing light to be incident in the photosensitizing dye can be drawn out through the semiconductor layer, wherein the semiconductor layer is formed by a plurality of regions having different energy levels from one another of a passage through which the charge carrier is transferred and comprises the regions in which the energy levels of the semiconductor layer are reduced stepwise and/or continuously in the direction of drawing the charge carrier out.

Further, the invention relates to a method for producing a dye-sensitized photoelectric conversion apparatus which comprises a semiconductor layer comprising a photosensitizing dye and is constituted such that a charge carrier generated by allowing light to be incident in the photosensitizing dye can be drawn out through the semiconductor layer, comprising the steps of: constituting the semiconductor layer by a plurality of regions having different energy levels from one another of a passage through which the charge carrier is transferred; and arranging the plurality of regions such that the energy levels are reduced stepwise and/or continuously in the direction of drawing the charge carrier out.

According to the invention, since the region in which the energy level of the passage through which the charge carrier is transferred is reduced in the direction of drawing the charge carrier out is formed in at least one portion of an inside part of the semiconductor layer which is the passage of the charge carrier leading from the interface between the semiconductor layer and the photosensitized dye to the electrode for drawing the charge carrier out, the charge carrier is subjected to a force in the direction of drawing the charge carrier out in the region and, accordingly, a movement of the charge carrier is set to be in the direction of drawing the charge carrier out.

Namely, since the transfer of the charge carrier after being injected in the semiconductor layer is controlled based on the energy level of the passage, through which the charge carrier is transferred, in the semiconductor layer, in comparison with a case in which the transfer of the charge carrier is relied on a diffusive migration, the number of the charge carriers which can reach the electrode from which the charge carriers are drawn out is increased, to thereby enhance the energy conversion efficiency.

BEST MODE FOR CARRYING OUT THE INVENTION

Figure 1A:
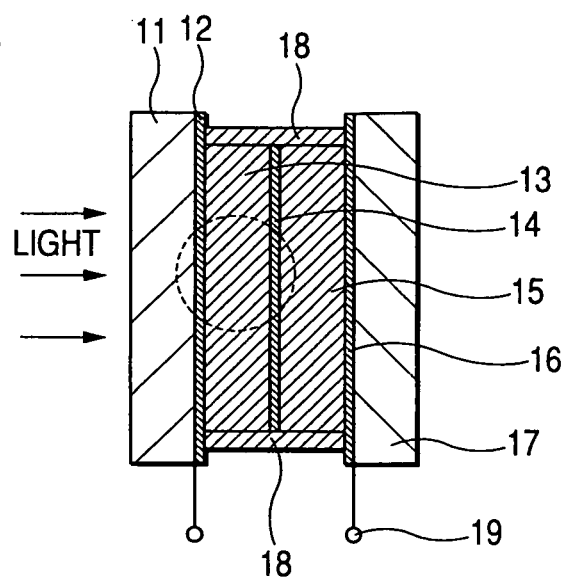
FIGS. 1A and 1B are a schematic cross-sectional diagram of an illustrative example of a dye-sensitized photochemical cell according to Embodiment 1 and an enlarged cross-sectional view of a major portion thereof, respectively.

According to the present invention, preferably, the semiconductor layer is formed by a plurality of layers having different minimum energy levels from one another of conduction band and the energy levels are reduced stepwise and/or continuously in the direction of drawing the charge carrier out.

Preferably, the plurality of regions are constituted by a plurality of semiconductor materials in which constitutional elements are different from one another, or semiconductor materials comprising same constitutional elements with one another such that ratios of the constitutional elements are changed stepwise and/or continuously in the direction of drawing the charge carrier out.

Further, preferably, the plurality of regions are constituted by semiconductor materials comprising a same element composition and different dopants from one another or are constituted by materials in which a same dopant is doped in a semiconductor material having a same element composition such that a concentration of the dopant is changed stepwise and/or continuously in the direction of drawing the charge carrier out.

Further, preferably, on the side to which the photosensitizing dye is adhered, an irregular contour is formed on a first semiconductor layer and, by joining the irregular contour with a second semiconductor layer, the semiconductor layer is constituted.

According to the invention, preferably, the semiconductor layer comprising the photosensitizing dye and an electrolyte layer are laminated one on the other between a pair of electrodes, to thereby constitute a dye-sensitized photochemical cell.

According to the invention, preferably, the semiconductor layer is constituted by a plurality of layers having different minimum energy levels from one another of conduction band and the energy levels are reduced stepwise and/or continuously in the direction of drawing the charge carrier out.

Preferably, the plurality of regions are formed by laminating one on the other a plurality of semiconductor materials having different constitutional elements from one another one on the other or laminating a plurality of semiconductor materials, having a same constitutional element, in which ratios of the constitutional elements are changed stepwise and/or continuously in the direction of drawing the charge carrier out.

On this occasion, as for a laminating method, preferably, a step of forming a thin film comprising the semiconductor material by a sputtering method or a sol-gel method, or a step comprising coating of a dispersion containing a superfine grain of a semiconductor material, evaporating of a dispersion medium, and sintering, melt-fusing or bonding of the superfine grain is repeatedly performed on the plurality of semiconductor materials.

Further, preferably, when a step of doping a plurality of types of dopants in the semiconductor layer by means of an ion implantation is performed, the plurality of regions are formed by doping a dopant having a larger effect in reducing the energy level in an inner portion by using a larger acceleration voltage by means of the ion implantation.

Further, preferably, when a step of doping a single type of dopant in the semiconductor layer by means of an ion implantation is performed, the ion implantation by a large acceleration voltage is performed with a high dosage while the ion implantation by a small acceleration voltage is performed with a low dosage. Thus, the plurality of regions are formed.

Further, preferably, the energy level is changed by implanting an oxygen ion in the semiconductor layer.

Preferably, when a step of doping a plurality of types of dopants by introducing a dopant-containing gas into an atmospheric gas while the semiconductor layer is being formed by a sputtering method is performed, the plurality of regions are formed by performing such doping in the order of from a dopant having a large effect in reducing the energy level to a dopant having a small effect in reducing the energy level.

Preferably, when a step of doping a single type of dopant by introducing a dopant-containing gas into an atmospheric gas while the semiconductor layer is being formed by a sputtering method is performed, the plurality of regions are formed by reducing a concentration of the dopant-containing gas.

According to the invention, preferably, the photosensitizing dye is adhered on a surface of the semiconductor layer or impregnated inside the semiconductor layer.

When the photosensitizing dye is impregnated inside the semiconductor layer, after the plurality of regions are formed, there is a case in which the photosensitizing dye is impregnated in the plurality of regions at one time or another case in which the photosensitizing dye is impregnated to each region while the plurality regions are being formed.

Hereinafter, embodiments according to the invention will be described with reference to drawings.

Figure 1B:
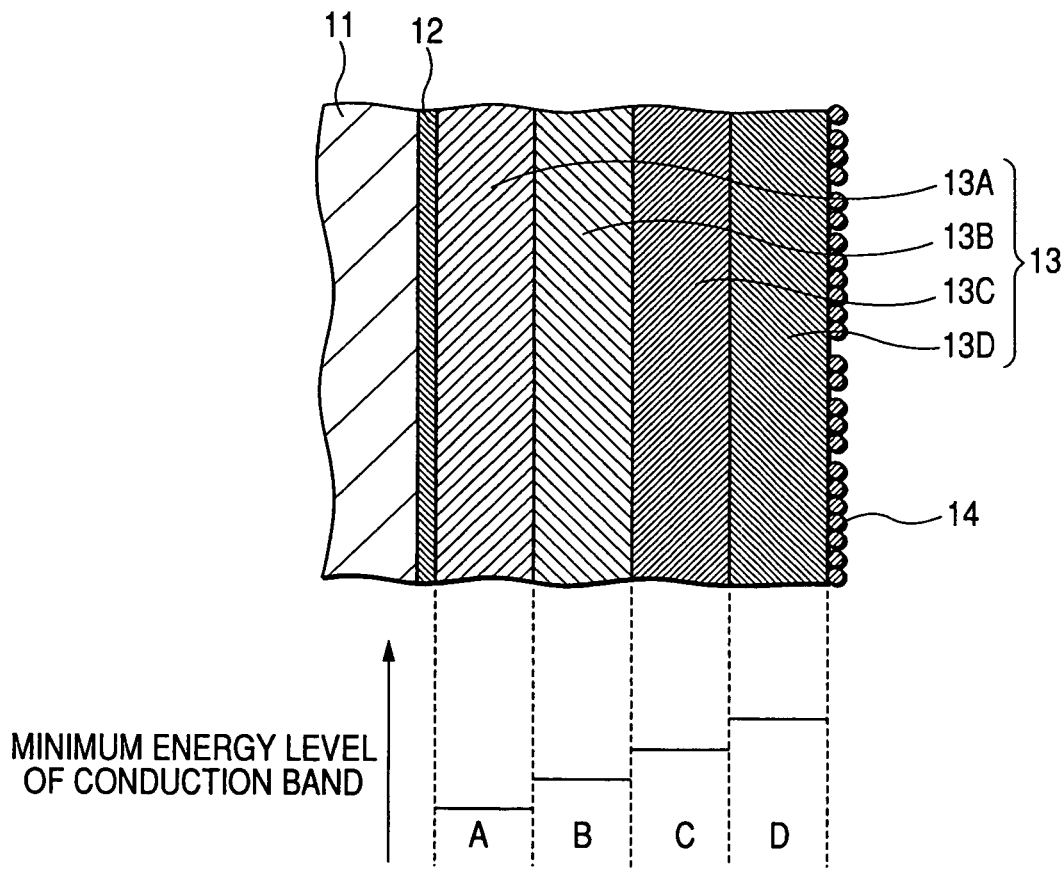

Embodiment 1: A case in which semiconductor layers having different band structures from one another are laminated FIGS. 1A and 1B are a schematic cross-sectional diagram of an illustrative example of a dye-sensitized photochemical cell according to Embodiment 1 and an enlarged cross-sectional view of a major portion thereof taken along a broken line in the schematic cross-sectional diagram, respectively.

A transparent substrate 11 is a material having such a property and a shape as allow light to be easily transmitted; for example, a glass sheet or a transparent plastic sheet made of, for example, polyethylene terephthalate or polycarbonate is used. Since it is not necessary that the other substrate 17 is transmittable to light, an opaque glass sheet, a plastic sheet, ceramic sheet or metal sheet may be used.

On a surface of the transparent substrate 11, a transparent electrode 12 is formed as an electrode (negative electrode) for drawing an electron out. A material of the transparent electrode 12 is tin oxide doped with antimony or fluorine, indium oxide doped with tin or the like. The transparent electrode 12 is formed by any one of a sputtering method, a CVD (Chemical Vapor Deposition) method, a sol-gel method, a vacuum deposition method, a coating method and the like.

A semiconductor layer 13 is constituted by a plurality of semiconductor layers having different constitutional elements from one another. Take a case of FIG. 1B as an example, the semiconductor layer 13 is constituted by semiconductor thin films 13A to 13D comprising 4 types of semiconductor materials A to D. Thickness of each layer is in the range of from approximately 10 nm to approximately 10 μm.

Materials applicable to constitutional materials of the semiconductor thin films 13A to 13D described in the order of from such material having a high minimum energy level of the conduction band to that having a low minimum energy level (the former number in each parenthesis denotes a minimum energy level (LUMO) of the conduction band while the latter number therein denotes a maximum energy level (HOMO) of valence electron band in voltage (V) against reference hydrogen electrode voltage) are as follows:

GaP (−1, 1.2), $ZrO_2$ (−1, 4), Si (−0.8, 0.2), CdS (−0.5, 2), $KTaO_3$ (−0.4, 3), CdSe (−0.2, 1.5), $SrTiO_3$ (−0.2, 3), $TiO_2$ (0, 2.95), $Nb_2O_5$ (0, 3.25), ZnO (0, 3.05), $Fe_2O_3$ (0.2, 2.4), $WO_3$ (0.3, 2.8), $SnO_2$ (0.5, 4) and $In_2O_3$ (0.5, 3).

Figure 2:
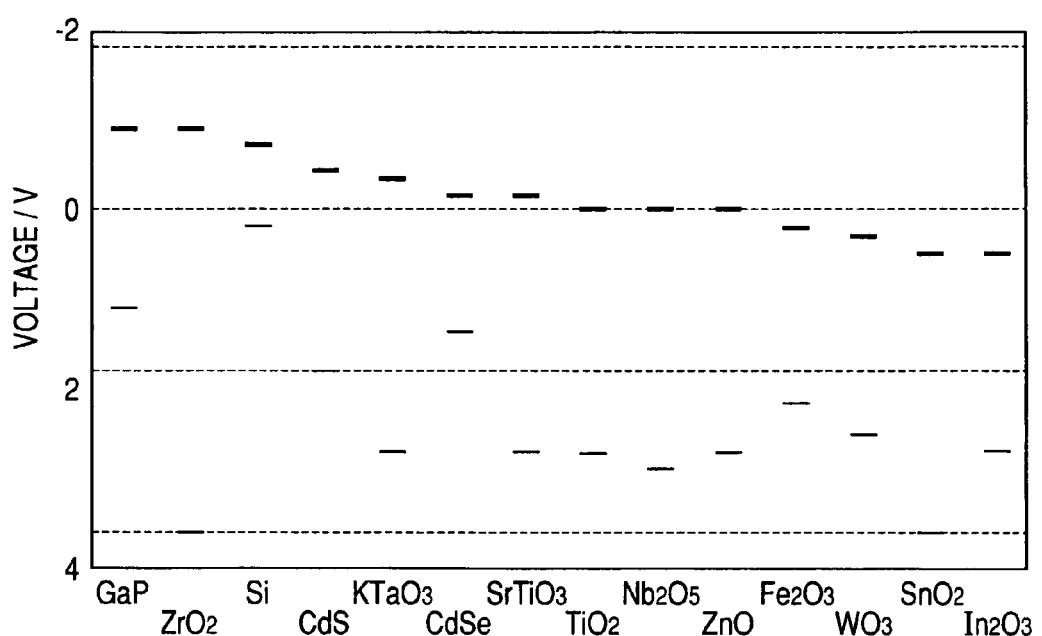
FIG. 2 illustrates LUMO and HOMO of various types of semiconductor materials in the order of from a semiconductor material having a high LUMO to that having a low LUMO.

FIG. 2 illustrates LUMO and HOMO of the aforementioned semiconductor materials.

A plurality of semiconductor materials, that is, four types of semiconductor materials A to D in a case of FIG. 1A and 1B, are selected from among the aforementioned semiconductor materials and, then, thin films of those materials are laminated on the transparent electrode 12 in the order of from the thin film having a low LUMO to that having a high LUMO by using the sputtering method, the sol-gel method or the like.

In such a manner as described above, by laminating a plurality of semiconductor materials having different band structures from one another on the transparent electrode (negative electrode) 12 in the order of from the semiconductor material having a low LUMO to that having a high LUMO, a structure of an entire semiconductor layer 13 in which the energy level of the passage through which a conduction band electron is transferred is decreased in the direction of the transparent electrode (negative electrode) 12 can be formed.

A photosensitizing dye 14 is adsorbed on the semiconductor layer 13 thus laminated. The photosensitizing dye 14 uses a ruthenium-based metal complex such as cis-bis(isothiocyanate)bis(2,2'-bipyridyl-4,4'-dicarboxylic acid)Ru(II).

In order to allow the photosensitizing dye 14 to be adsorbed on the semiconductor layer 13, for example, in a case of the above-described ruthenium complex, the semiconductor layer 13 is dipped in a $3.0 \times 10^{-4}$ mol/L ethanol solution of the ruthenium complex for 20 hours and, then, ethanol is evaporated.

As for a counter electrode 16, a metal such as platinum or gold is preferred. The counter electrode 16 is produced on a substrate 17 by using a vacuum deposition method. The semiconductor layer 13 and the counter electrode 16 are arranged opposite to each other and a space between both electrodes is filled with an electrolyte layer 15.

As for the electrolyte layer 15, an electrolyte solution, or an electrolyte in a gel state or a solid state can be used. As for the electrolyte solution, a solution containing an oxidation-reduction system (redox pair) such as $I^-/I_2$ is mentioned. Particularly, a glutaronitrile solution containing 0.6 mol/L of tetrapropyl ammonium iodide[$N(C_3H_7)_4$] I and $5 \times 10^{-2}$ mol/L of iodine $I_2$ is used.

A side face of the cell is hermetically sealed by a sealing material 18 such as an epoxy-based thermosetting resin, an acrylic-based ultraviolet-ray curing resin or water glass. In such a manner as described above, the laminated semiconductor layer as shown in FIG. 1B can be incorporated into the dye-sensitized solar cell as shown in FIG. 1A.

Figure 3:
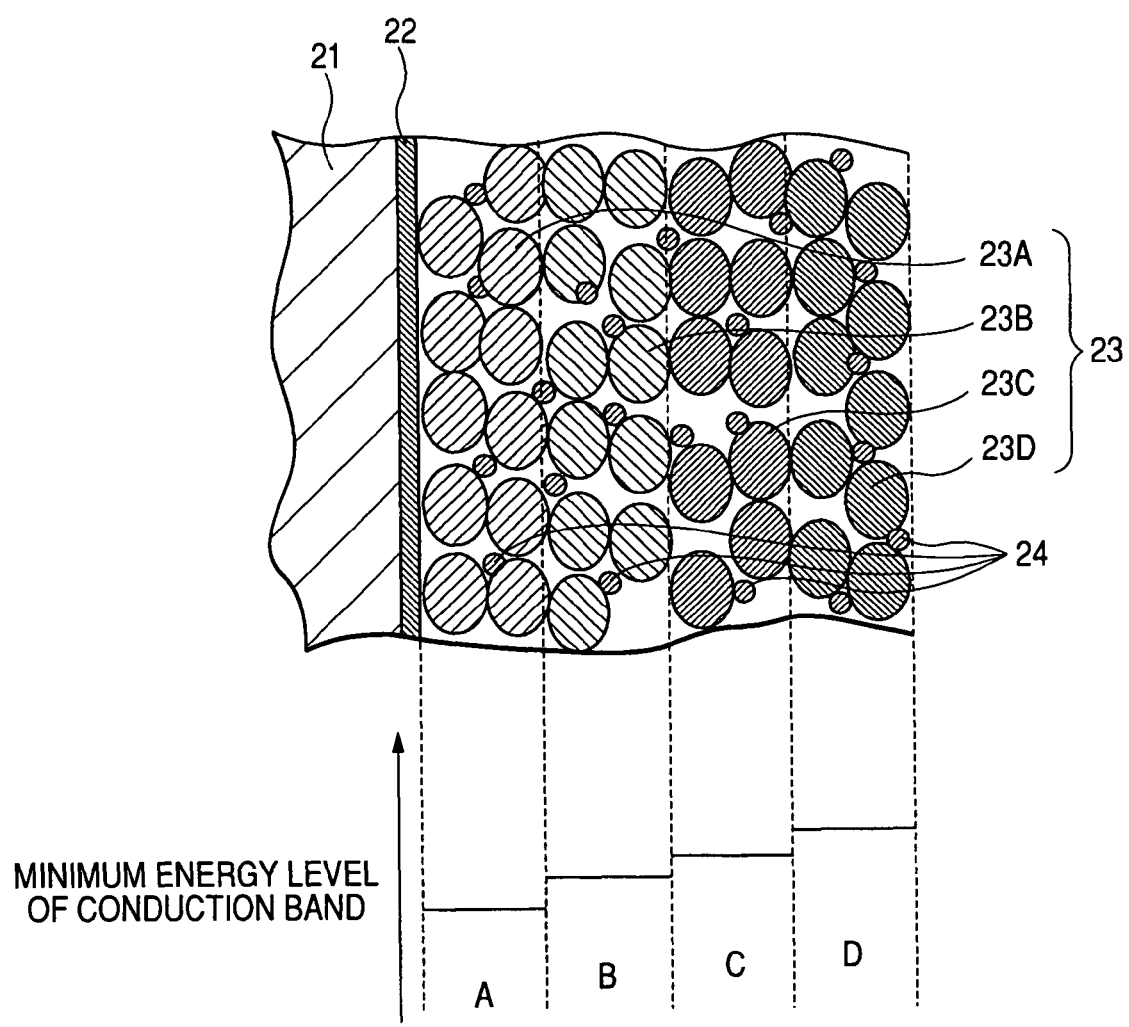
FIG. 3 is an enlarged cross-sectional view of a major portion of a dye-sensitized photochemical cell according to Embodiment 2.

Embodiment 2: A case in which semiconductor superfine grains having different band structures from one another are laminated FIG. 3 is an enlarged cross-sectional view of a major portion of a negative electrode according to Embodiment 2 of the invention. A schematic cross-sectional view of an entire dye-sensitized photochemical cell is same as in Embodiment 1 as shown in FIG. 1A and, accordingly, omitted.

In Embodiment 1, a case in which thin films of the semiconductor materials are laminated one on the other is shown, but, in Embodiment 2, a process comprising coating of a dispersion in a paste state containing superfine grains of the semiconductor material, evaporating of a dispersion medium and sintering of the superfine grains is repeatedly performed on a plurality of semiconductor materials, to thereby produce a laminate structure.

In a same manner as in Embodiment 1, by laminating a plurality of semiconductor materials having different band structures from one another on the transparent electrode (negative electrode) 12 in the order of from the semiconductor material having a low LUMO to that having a high LUMO, a structure of an entire semiconductor layer 13 in which the energy level of the passage through which a conduction band electron is transferred is decreased in the direction of the transparent electrode (negative electrode) 12 can be formed.

As for a transparent substrate 21, a transparent substrate having such a property and shape as allow light to be easily transmitted, for example, a transparent glass sheet or a transparent substrate of plastic is preferably used. However, since in Embodiment 2 the manufacturing process comprises a step of sintering the semiconductor superfine grains at about 500° C., it is practical to use the glass sheet. Since it is not necessary that a substrate 27 is transmittable to light, an opaque glass sheet, a plastic sheet, ceramic sheet or metal sheet may be used.

On a surface of the transparent substrate 21, a transparent electrode 22 comprising tin oxide doped with antimony or fluorine, indium oxide doped with tin or the like is formed. The transparent electrode 22 is formed by any one of a sputtering method, a CVD (Chemical Vapor Deposition) method, a sol-gel method, a vacuum deposition method, a coating method and the like.

A semiconductor layer 23 is constituted by a plurality of semiconductor layers having different constitutional elements from one another. Take a case of FIG. 3 as an example, the semiconductor layer 23 is constituted by semiconductor porous films 23A to 23D comprising 4 types of semiconductor materials A to D. Thickness of each layer is in the range of from approximately 10 nm to approximately 10 μm.

Materials applicable to constitutional materials of the semiconductor porous films 23A to 23D described in the order of from such material having a high minimum energy level (LUMO) of the conduction band to that having a low minimum energy level (LUMO) of the conduction band are as follows:

$GaP$, $ZrO_2$, $Si$, $CdS$, $KTaO_3$, $CdSe$, $SrTiO_3$, $TiO_2$, $Nb_2O_5$, $ZnO$, $Fe_2O_3$, $WO_3$, $SnO_2$ and $In_2O_3$.

Energy levels of LUMO and HOMO of various types of materials are those as described in Embodiment 1 and, also, in FIG. 2.

A plurality of semiconductor materials, that is, four types of semiconductor materials A to D in a case of FIG. 3, are selected from among the aforementioned semiconductor materials and, then, thin films of those materials are laminated on the transparent electrode 22 in the order of from the thin film having a low LUMO of the conduction band to that having a high LUMO of the conduction band.

Particularly, firstly, superfine grains of the semiconductor material having the lowest minimum energy level of the conduction band are dispersed in an aqueous nitric acid solution or hydrochloric acid or the like to form a dispersion in a paste state and, then, the thus-formed dispersion in the paste state is applied on the transparent electrode 22 by a doctor blade method or the like and, after water is evaporated therefrom, sintered at about 500° C., to thereby produce the semiconductor porous film 23A.

Next, the dispersion in the paste state which is prepared by dispersing superfine grains of the semiconductor material having the second lowest minimum energy level of LUMO is applied onto the semiconductor porous film 23A and then, after water is evaporated therefrom, sintered at about 500 C, whereby the semiconductor porous film 23A is formed.

Further, the above-described process is repeated two more times to form the semiconductor layer 23 which is consisted by the semiconductor porous film 23A to 23D which are laminated on the transparent electrode (negative electrode) 22 in order of from the semiconductor material having a low minimum energy level of the conduction band to that having a high minimum energy level.

In such a manner as described above, a structure of an entire semiconductor layer 23 in which the energy level of the passage through which a conduction band electron is transferred is decreased in the direction of the transparent electrode (negative electrode) 22 can be formed.

A photosensitizing dye 24 is adsorbed on the thus-laminated semiconductor layer 23 comprising porous films. The photosensitizing dye 24 uses a ruthenium-based metal complex such as cis-bis(isothiocyanate)bis(2,2'-bipyridyl-4,4'-dicarboxylic acid)Ru(II).

In order to allow the photosensitizing dye 24 to be adsorbed on the semiconductor layer 23, for example, in a case of the above-described ruthenium complex, the semiconductor layer 23 is dipped in a $3.0 \times 10^{-4}$ mol/L ethanol solution of the ruthenium complex for 20 hours and, then, ethanol is evaporated.

As shown in FIG. 3, in a case of Embodiment 2, since the photosensitizing dye 24 is adsorbed by being taken in the semiconductor film 23, the photosensitizing dye 24 comes to be in direct contact with the semiconductor porous films 23A to 23D having different band structures from one another.

However, the photosensitizing dye 24 maybe adsorbed only on the surface of the semiconductor layer 23, instead of being taken therein.

In a case of the porous film formed from superfine grains of the semiconductor material, the superfine grains are in point contact with one another and electric contacts between superfine grains are broken by spaces existing all around. Therefore, in comparison with a case of using a bulk layer having no space, a transfer path of the electron injected from the photosensitizing dye 24 becomes complicated and, accordingly, it is considered to particularly effectively contribute to the transfer of the electron which is the charge carrier that the semiconductor layer 23 has the structure in which the energy level of the passage through which the conduction band electron is transferred is reduced in the direction of the transparent electrode (negative electrode) 22.

As for a counter electrode, a metal such as platinum or gold is preferred. The counter electrode is produced on a substrate by using a vacuum deposition method or the like. The semiconductor layer 23 and the counter electrode are arranged opposite to each other and a space between both electrodes is filled with an electrolyte layer.

As for the electrolyte layer, an electrolyte solution, or an electrolyte in a gel state or a solid state can be used. As for the electrolyte solution, a solution containing an oxidation-reduction system (redox pair) such as $I^-/I_2$ is mentioned. Particularly, a glutaronitrile solution containing 0.6 mol/L of tetrapropyl ammonium iodide and $5 \times 10^{-2}$ mol/L of iodine is used.

A side face of the cell is hermetically sealed by a sealing material such as an epoxy-based thermosetting resin, an acrylic-based ultraviolet-ray curing resin or water glass. In such a manner as described above, it becomes possible to incorporate the semiconductor layer 23 comprising the laminated semiconductor porous films 23A to 23D as shown in FIG. 3 into the dye-sensitized solar cell as shown in FIG. 1A.

Embodiment 3: A semiconductor layer (1) comprising a complex of a titanium oxide thin film having a drift region of an electron inside and a titanium oxide fine grain Hereinafter, with reference to FIGS. 4A to 4G, a manufacturing process of a semiconductor layer 33 comprising a complex of a titanium thin film having a drift region of an electron inside and a titanium oxide fine grain will be described.

Step 1

A thin film electrode 32 is formed on a surface of a substrate 31. As for the substrate 31, for example, a glass sheet is used. The thin film electrode 32 is, for example, a thin film of indium oxide doped with tin (ITO) or gold and is formed by a vapor deposition or sputtering.

Step 2

A $TiO_2$ thin film 41 is formed on the substrate 31. Such film forming may be performed by sputtering or, otherwise, may be performed by a sol-gel method.

When the substrate 31 is titanium Ti, a $TiO_2$ layer 41 may be formed by using an anodic oxidation coating.

Step 3

An impurity (dopant) is doped in the $TiO_2$ thin film 41 by using an ion implantation method. The impurity effectively changes a forbidden band width of the $TiO_2$ layer 41 and can use, for example, Cr, V, N, B or Al.

An ion implantation is performed from a surface 42 of the $TiO_2$ thin film 41 and the impurity is doped in an innermost portion of the $TiO_2$ thin film 41. Succeedingly after the ion implantation, an activation annealing is performed. It is necessary to appropriately set an annealing condition depending on combinations of types of the impurities and ion implantation conditions and, for example, in a case of Cr, a temperature of 450° C. and thereabout can be used. At that time, an impurity diffusion layer 43 is formed by a thermal diffusion of the impurity.

In the thus-formed impurity diffusion layer 43, there is an impurity concentration distribution in which an impurity concentration in the innermost portion thereof is highest and the impurity concentration becomes lower in the direction of the surface thereof. For this account, the energy level (LUMO) of the passage through which the conduction band electron is transferred becomes lower as a position moves from the surface 42 to the thin film electrode 32 and, then, a structure in which the electron is accelerated in the direction of the thin film electrode 32 (in the direction of thickness of the $TiO_2$ thin film 41) is formed.

At the time of performing the ion implantation, the aforementioned impurity concentration distribution can also be formed by performing the ion implantation with a high dosage by using a large acceleration voltage and the ion implantation with a low dosage by using a small acceleration voltage and, then, performing activation annealing.

In order to dope the impurity by the thermal diffusion, an impurity gas (dopant-containing gas) is introduced into an atmospheric gas, while the $TiO_2$ thin film 41 is being formed on the thin film electrode 32 by the sputtering method. At that time, an impurity gas concentration in the atmospheric gas is allowed to be high at an early time of the sputtering and, then, to be gradually reduced.

Step 4

After a resist film 44 is applied on the $TiO_2$ thin film 41, a pattern, for example, in a stripe state is formed on the resist film 44 by using a photolithography technique.

Step 5

An etching is performed on the $TiO_2$ thin film 41 having the-thus formed pattern on the surface 42 thereof by ion milling or solution etching, to thereby form a multitude of grooves (concave portions) 45 on the surface 42. Depth of such groove 45 is set to be in the range, for example, of from about 1 μm to about 10 μm. Width of the groove 45 is set to be such an extent as a sufficient amount of the paste of the $TiO_2$ fine grains can enter in the subsequent step 6.

Step 6

Lastly, on the surface 42 of the $TiO_2$ thin film 41 having a groove 45 thereon, a dispersion of the $TiO_2$ fine grains 47 in the paste state is applied and, after a dispersion medium is evaporated, is sintered at a temperature of, preferably, from 450° C. to 550° C. and, more preferably, 500° C. At that time, electric contacts between the $TiO_2$ fine grains 47 and the surface of the $TiO_2$ thin film 41 on which a concave portion 45 and a convex portion 46 are formed by being provided with the groove 45 are formed, to thereby form a complex layer 33 of the $TiO_2$ thin film and the $TiO_2$ fine grains.

Step 7

Lastly, a photosensitizing dye is adsorbed on the $TiO_2$ fine grains 47. The photosensitizing dye which is a dye having an absorption band of from 200 nm to 1500 nm uses a ruthenium-based metal complex, such as cis-bis(isothiocyanate)-bis(2,2'-bipyridyl-4,4'-dicarboxylic acid)Ru(II), or the like.

In a case of the aforementioned ruthenium complex, the $TiO_2$ fine grains 47 are dipped in a $3.0 \times 10^{-4}$ mol/L ethanol solution of ruthenium complex for 20 hours and, then, ethanol is evaporated therefrom, to thereby allow the photosensitizing dye to be adsorbed on the $TiO_2$ fine grains 47.

Figure 4A:
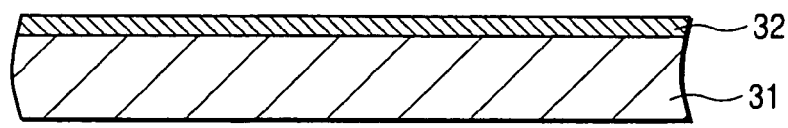
FIGS. 4A to 4G are a schematic cross-sectional diagram explaining a manufacturing process of a semiconductor layer comprising a complex of a titanium oxide thin film and a titanium oxide fine grain having a drift region of an electron inside according to Embodiment 3 and a schematic cross-sectional diagram explaining a manufacturing process of a semiconductor layer comprising a complex of a titanium oxide thin film and a titanium oxide fine grain having a drift region of an electron inside.
Figure 4B:
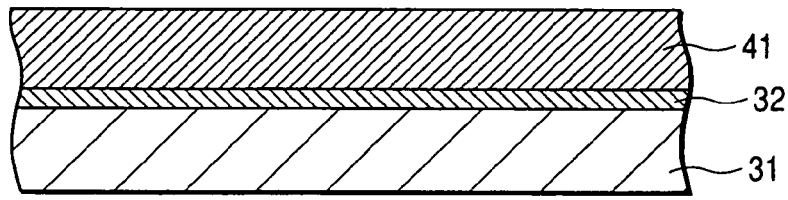
Figure 4C:
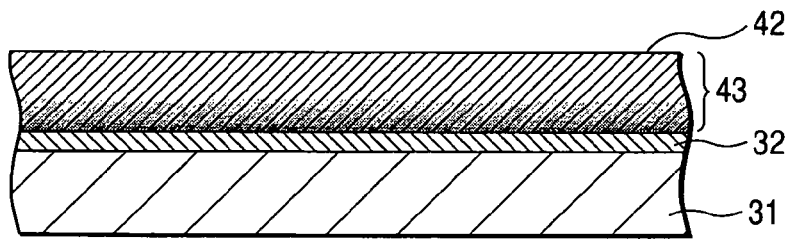
Figure 4D:
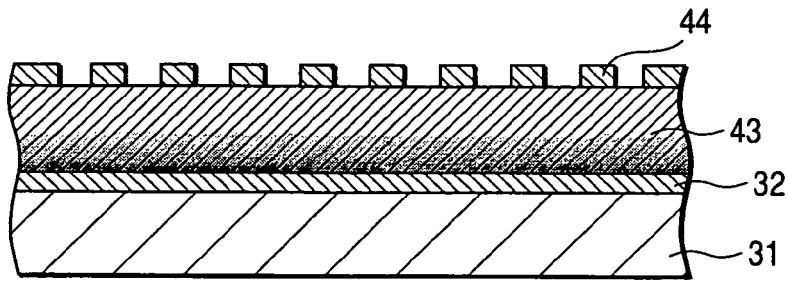
Figure 4E:
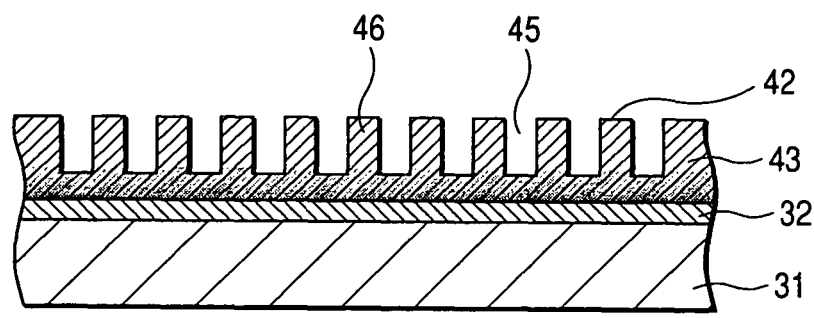
Figure 4F:
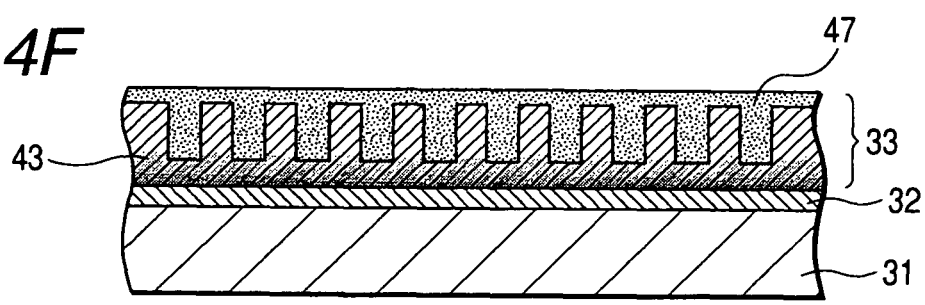
Figure 4G:
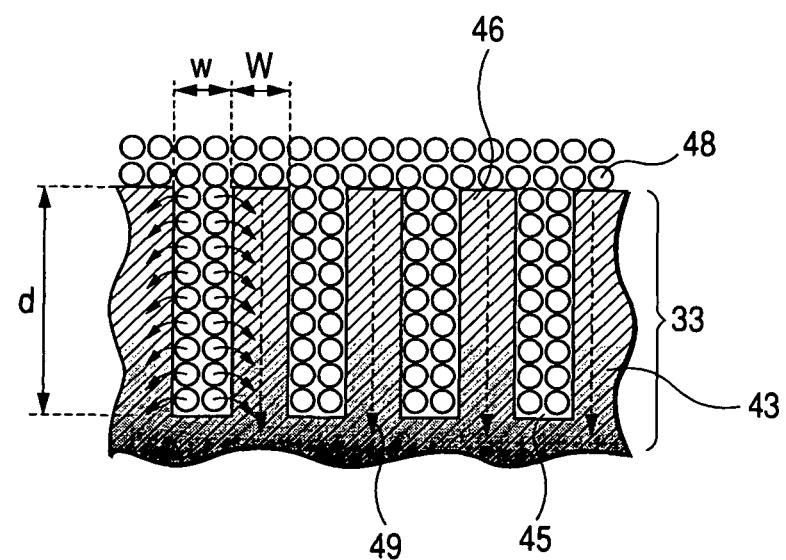

In the semiconductor layer 33 comprising the complex 33 of the titanium oxide thin film 41 and the titanium oxide fine particles 47 as shown in FIG. 4G, as described before, a structure in which the conduction electron is accelerated in the direction (in the direction of depth of the $TiO_2$ thin film 41) 49 of drawing the electron out as shown by an arrow in a dotted line is formed in the convex portion 46 of the thin film 41.

For this account, immediately after the conduction band electron (shown by the arrow) which is subjected to a charge separation from the photosensitizing dye which absorbed light at the interface between the photosensitive dye and the titanium oxide fine grains and drawn into the inside of the titanium oxide fine grains 47 reaches the convex portion 46, the electron is subjected to a force in the direction 49 of drawing the electron out and a movement of the conduction band electron is controlled such that it is drifted in the direction of the thin film electrode 32. As a result, the amount of the electrons to be drawn outside, namely, an output current is increased.

Further, in comparison with the fine grain layer 47 in which spaces are large in number and fine grains are subjected to point contact with one another, since the convex portion 46 is a bulk layer having no space, it has a large effective cross-sectional area and has a small resistance. Therefore, the energy of the conduction band electron which is lost by being converted into heat by means of an inner resistance becomes smaller in a case of transfer of the electron in the convex portion 46 than in a case of diffusion thereof in the fine grain layer 47 by a same distance and, then, an output voltage is increased.

On the other hand, since the photosensitizing dye is adsorbed on the surface of the $TiO_2$ fine grain 47, an adsorption area is substantially large compared with a case of being adsorbed on the $TiO_2$ thin film 41. Therefore, a larger amount of the photosensitizing dye can be adsorbed and, then, an amount of light to be absorbed can be increased.

As described above, a dye-sensitized photoelectric conversion apparatus comprising the semiconductor layer 33 comprising the complex of the $TiO_2$ thin film 41 and the $TiO_2$ fine grain 47 as shown in FIG. 4G simultaneously has two advantages of a low resistance of the bulk layer and a large surface area of the fine grain layer and, since a structure of leading the conduction band electron in the direction of drawing the electron out is formed in the $TiO_2$ thin film 41, the output current and the output voltage are simultaneously improved, to thereby enhance an effective photoelectric conversion efficiency.

Further, as shown in FIG. 4G, when width of the groove (concave portion) 45 is expressed by w, width of the convex portion by W and depth of the irregularity by d, w, W and d are preferably under such conditions as described below.

As the groove 45 cut in the $TiO_2$ thin film 41 is formed more densely and the depth of the groove (concave portion) 45 is deeper, a contact area between the $TiO_2$ fine grain 47 and the $TiO_2$ thin film 41 becomes larger and a change of taking the conduction band electron inside the $TiO_2$ fine grains 47 in the drift region becomes larger. Also from such point as described above, w and W are preferably as small as possible while d is preferably as large as possible. However, when w is unduly small and d is unduly large, it becomes difficult to introduce the paste of the $TiO_2$ fine grain 47 into the groove (concave portion) 45. Under these circumstances, the depth d of the groove 45 is set in the range, for example, of from 1 μm to 10 μm approximately and the following relations may be established:

$$1 \leq w/d \leq 2; \text{ and}$$

$$1 \leq w/W.$$

Figure 5A:
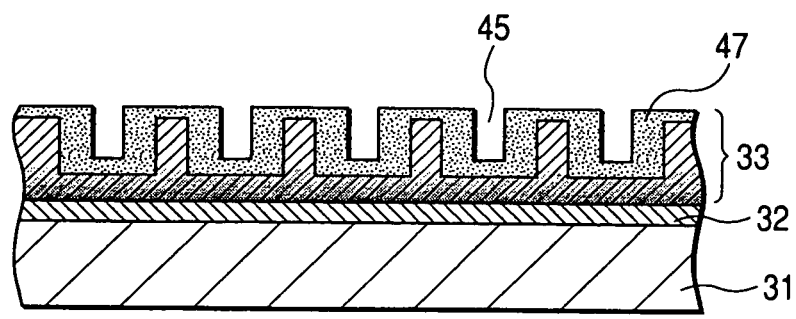
FIGS. 5A and 5B are a schematic cross-sectional diagram explaining a manufacturing process of a semiconductor layer comprising a complex of a titanium oxide thin film and a titanium oxide fine grain having a drift region of an electron inside according to Embodiment 4 and an enlarged cross-sectional view of a major portion thereof.
Figure 5B:
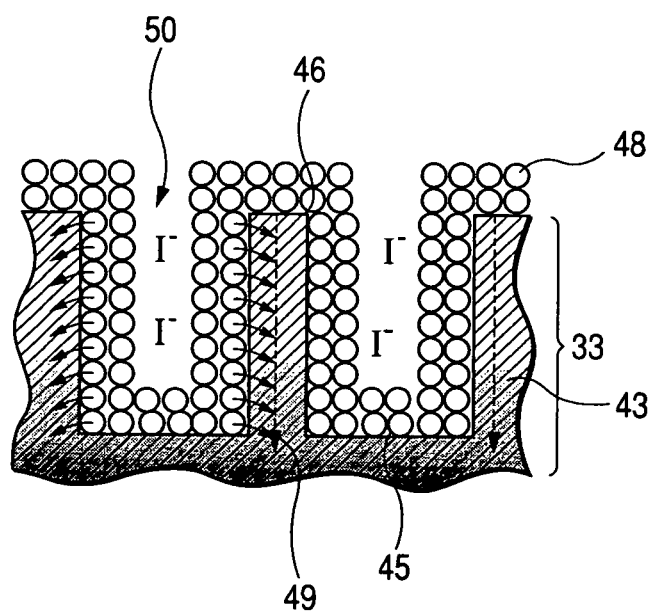
Figure 6:
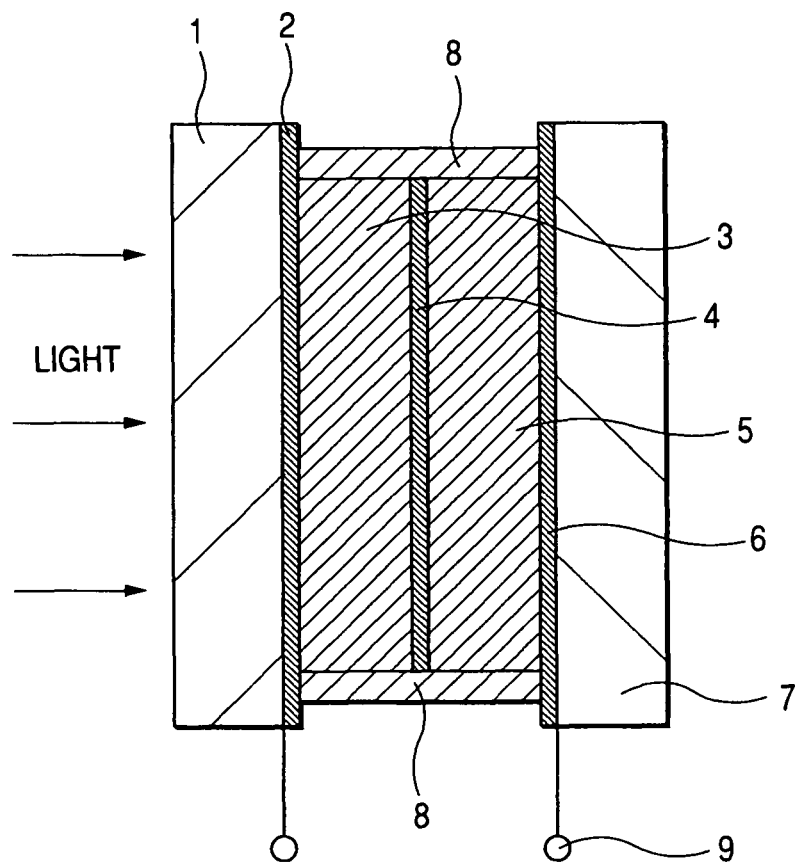
FIG. 6 is a schematic cross-sectional diagram of an illustrative example of a conventional dye-sensitized photochemical cell.

As for representative values, W=w=10 μm and d=5 μm.
Embodiment 4: A semiconductor layer (2) comprising a complex of a titanium oxide thin film having a drift region of an electron inside and a titanium oxide fine grain FIGS. 5A and 5B are a schematic cross-sectional diagram showing a semiconductor layer 33 comprising a complex of a titanium oxide thin film and a titanium oxide fine grain according to Embodiment 4 and an enlarged cross-sectional view of a major portion thereof.

It is not necessary for the $TiO_2$ fine grain layer 47 as described in Embodiment 3 to fill the groove (concave portion) 45 cut in the $TiO_2$ thin film 41 out. As shown in FIGS. 5A and 5B, an irregular pattern having the groove (concave portion) 45 wider than the thickness of the $TiO_2$ fine grain layer 47 may be provided on the surface 42 of the $TiO_2$ thin film 41.

On this occasion, since the electrolyte layer 5 can be moved in a gap 50 remaining in the groove (concave portion) 45, when the photosensitizing dye 4 adsorbed on the $TiO_2$ fine grain 48 of the concave portion 45 loses the electron by absorbing light, the reducing agent (for example, $I^-$) in the electrolyte layer 5 becomes easy to advance to the photosensitizing dye 4. As a result, since the photosensitizing dye 4 which has lost the electron is quickly reduced to be regenerated, even when light having a high light intensity is incident, it hardly occurs that the dye-sensitized photochemical cell is saturated.

In Embodiment 4, since other points than that described above are same as those in Embodiment 3, it goes without saying that effects as described in Embodiment 3 also exist in Embodiment 4.

The invention has so far been described with reference to embodiments; however, the invention is by no means limited thereto and it should be appreciated that various changes and modification can appropriately be made without departing from the scope and spirit of the invention.

INDUSTRIAL APPLICATION

According to the present invention, since a region in which an energy level of a passage through which a charge carrier is transferred is reduced in the direction of drawing the charge carrier out is formed in at least one portion inside a semiconductor layer which is a passage of a charge carrier from an interface between a semiconductor layer and a photosensitizing dye to a charge carrier drawing-out electrode, the charge carrier is subjected to a force in the direction of drawing the carrier out in this region and movement of the charge carrier is directed in the direction of drawing the carrier out.

Namely, since transportation of the charge carrier after being implanted in the semiconductor layer is controlled based on the energy level of the passage through which the charge carrier is transferred in the semiconductor layer, the number of charge carriers which can reach the charge carrier drawing-out electrode is increased, to thereby enhance energy conversion efficiency.

The invention claimed is:

1. A dye-sensitized photoelectric conversion apparatus, comprising:
   a semiconductor layer comprising a photosensitizing dye, wherein a charge carrier generated by allowing light to be incident in the photosensitizing dye can be drawn out through the semiconductor layer,
   wherein the semiconductor layer comprises:
   an impurity diffusion layer through which the charge carrier is transferred;
   a first semiconductor layer having a pattern that includes a concave portion and a convex portion; and
   a second semiconductor layer that is joined to the pattern of the first semiconductor layer, wherein the first semiconductor layer includes the impurity diffusion layer and the impurity diffusion layer has a concentration gradient that decreases continuously in a direction toward the second semiconductor layer.

2. The dye-sensitized photoelectric conversion apparatus as set forth in claim 1, wherein the photosensitizing dye is adhered on a surface of the semiconductor layer.

3. The dye-sensitized photoelectric conversion apparatus as set forth in claim 1, wherein the semiconductor layer comprising the photosensitizing dye and an electrolyte layer are laminated together between a pair of electrodes.

4. The dye-sensitized photoelectric conversion apparatus as set forth in claim 1, being as a dye-sensitized photochemical cell.

5. The dye-sensitized photoelectric conversion apparatus as set forth in claim 1, wherein the first semiconductor layer comprises a patterned film implanted with ions.

6. The dye-sensitized photoelectric conversion apparatus as set forth in claim 1, wherein the first semiconductor layer comprises sintered semiconductor particles.

7. The dye-sensitized photoelectric conversion apparatus as set forth in claim 1, wherein the second semiconductor layer comprises a gap into which an electrolyte material is deposited.

* * * * *